United States Patent
Lee et al.

(10) Patent No.: US 10,613,809 B2
(45) Date of Patent: Apr. 7, 2020

(54) DISPLAY DEVICE FOR DISPLAYING MULTIPLE APPLICATIONS ON FLEXIBLE DISPLAY AND METHOD FOR CONTROLLING THE DISPLAY DEVICE

(71) Applicant: LG ELECTRONICS INC., Seoul (KR)

(72) Inventors: Doyoung Lee, Seoul (KR); Sinae Chun, Seoul (KR); Sihwa Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 276 days.

(21) Appl. No.: 15/507,753

(22) PCT Filed: Sep. 1, 2014

(86) PCT No.: PCT/KR2014/008156
§ 371 (c)(1),
(2) Date: Feb. 28, 2017

(87) PCT Pub. No.: WO2016/035899
PCT Pub. Date: Mar. 10, 2016

(65) Prior Publication Data
US 2017/0308346 A1    Oct. 26, 2017

(51) Int. Cl.
*G06F 3/14*    (2006.01)
*G06F 1/16*    (2006.01)
*G09G 3/20*    (2006.01)

(52) U.S. Cl.
CPC ............. *G06F 3/1423* (2013.01); *G06F 1/16* (2013.01); *G06F 1/1652* (2013.01); *G06F 3/14* (2013.01);
(Continued)

(58) Field of Classification Search
CPC .................................................. G06F 3/1423
See application file for complete search history.

(56) References Cited

U.S. PATENT DOCUMENTS

| | | | |
|---|---|---|---|
| 2009/0009423 A1 | 1/2009 | Huang et al. | |
| 2010/0033435 A1 | 2/2010 | Huitema | |

(Continued)

FOREIGN PATENT DOCUMENTS

| | | |
|---|---|---|
| CN | 103514814 | 1/2014 |
| CN | 103946780 | 7/2014 |

(Continued)

OTHER PUBLICATIONS

European Patent Office Application Serial No. 14901128.0, Search Report dated Mar. 27, 2018, 11 pages.

(Continued)

*Primary Examiner* — Gustavo Polo
(74) *Attorney, Agent, or Firm* — Lee, Hong, Degerman, Kang & Waimey

(57) ABSTRACT

Disclosed are a display device for displaying multiple applications on a flexible display and a method for controlling the display device. The display device according to the present specification comprises a main display and a flexible display. When the flexible display is unrolled, the size of a first application execution screen is determined by the unrolled length. When the flexible display is further unrolled thereafter, a second application execution screen is displayed along with the first application execution screen on the flexible display. Here, the second application execution screen is displayed on the portion by which the flexible display has been increased and can be displayed on the part adjacent to the first application execution screen. According (Continued)

to the present specification, the size of an application execution screen can be determined according to the intent of a user.

20 Claims, 11 Drawing Sheets

(52) U.S. Cl.
CPC ....... *G09G 3/2092* (2013.01); *G09G 2320/06* (2013.01); *G09G 2340/04* (2013.01)

(56) References Cited

U.S. PATENT DOCUMENTS

| | | |
|---|---|---|
| 2012/0081267 A1 | 4/2012 | Sirpal et al. |
| 2013/0127799 A1 | 5/2013 | Lee |
| 2013/0201208 A1 | 8/2013 | Cho et al. |
| 2013/0203469 A1* | 8/2013 | Cho .................... G06F 3/04886 455/566 |
| 2013/0268877 A1* | 10/2013 | Han .................... G06F 3/04842 715/769 |
| 2014/0204037 A1 | 7/2014 | Kim |

FOREIGN PATENT DOCUMENTS

| | | |
|---|---|---|
| EP | 2881840 | 6/2015 |
| KR | 1020140017391 | 2/2014 |
| WO | 2014021660 | 2/2014 |

OTHER PUBLICATIONS

PCT International Application No. PCT/KR2014/008156, Written Opinion of the International Searching Authority dated Apr. 27, 2015, 16 pages.

The State Intellectual Property Office of the People's Republic of China Application Serial No. 201480081601.8, Office Action dated Jan. 9, 2019, 14 pages.

\* cited by examiner

DISPLAY DEVICE FOR DISPLAYING MULTIPLE APPLICATIONS ON FLEXIBLE DISPLAY AND METHOD FOR CONTROLLING THE DISPLAY DEVICE

CROSS-REFERENCE TO RELATED APPLICATIONS

This application is the National Stage filing under 35 U.S.C. 371 of International Application No. PCT/KR2014/008156, filed on Sep. 1, 2014, the contents of which are all hereby incorporated by reference herein in its entirety.

TECHNICAL FIELD

The present invention relates to a display device that includes a flexible display, and more particularly, to a display device for displaying multiple applications on a flexible display and a method for controlling the same.

BACKGROUND ART

Various electronic devices have been used in daily life in accordance with the development of semiconductor and communication technologies. Among the various electronic devices, a display device, which can view and listen to multimedia, has been used most widely. Particularly, technologies in which a plurality of displays are used have been used to use a wider screen in one display device. For example, there is a dual monitor in which two monitors are connected to one PC (personal computer).

Also, studies of a display device that includes a flexible display have been recently made to provide a larger display while maintaining portability of a portable device. For example, there is a display device in which a flexible display is rolled in a rollable display. The display device may extend a screen by unfolding the rollable display if necessary while using a main display.

In such a display device, the rollable display may have various unfolded lengths depending on intention of a user. In this case, it is required to determine which one of applications executed in the display device should be displayed on the rollable display or a size of an application execution screen displayed on the rollable display.

DISCLOSURE

Technical Problem

An object of the present invention devised to solve the problem of the relate art is to provide a display device that displays multiple applications on a flexible display and a method for controlling the same.

Technical Solution

To achieve the above object, a display device according to the present specification comprises a main display and a flexible display configured to display execution screens of applications set to a first application and a second application of multiple applications, a housing configured to keep the flexible display, a measurement unit configured to measure a length of a sub display and outputting a signal on the length, wherein the sub display is a portion of the flexible display and is exposed to the outside of the hosing and a controller configured to receive the signal from the measurement unit, wherein the controller is further configured to display the first application execution screen on the sub display when the length of the sub display is a previously set initial value or more, determine a size of the first application execution screen in proportional to a first length of the sub display if the length of the sub display is maintained for a predetermined time, and display the second application execution screen on the sub display together with the first application execution screen when receiving a signal for increasing the length of the sub display 120 from the measurement unit after determining the size of the first application execution screen.

According to one embodiment of the present specification, the controller may provide a user interface for setting the first application and the second application to the main display or the sub display.

According to another embodiment of the present specification, the controller may set the first application and the second application in accordance with application attributes of the first application and the second application selected by a user.

According to still another embodiment of the present specification, the controller may set an displayed order of the first application and the second application in accordance with a selected order when the multiple applications are selected by a user.

Moreover, the controller may further display a guide interface that may identify the first application execution screen from the second application execution screen.

Meanwhile, the controller according to the present specification may determine that the length of the sub display 120 is maintained for the predetermined time if the length of the sub display 120 is changed within an error range which is previously set.

According to one embodiment of the present specification, the controller may display a ratio of the first application execution screen on the sub display in accordance with a ratio of the sub display according to the first length.

According to another embodiment of the present specification, the controller may display a ratio of the first application execution screen on the sub display in accordance with a previously set ratio.

The controller according to the present specification may display the second application execution screen on the sub display to adjoin the first application execution screen.

The controller according to the present specification may determine a size of the second application execution screen in proportional to an increased portion length (hereinafter, 'second length') of the sub display if the increased length of the sub display 120 is maintained for the predetermined time.

At this time, according to one embodiment of the present specification, the controller may display a ratio of the second application execution screen on the sub display in accordance with a ratio of the sub display according to the second length.

According to another embodiment of the present specification, the controller may display the ratio of the second application execution screen on the sub display in accordance with the previously set ratio.

Meanwhile, the controller may display the second application execution screen on a portion of the sub display, which is adjacent to the housing or is the farthest away from the housing.

In this case, the controller may calculate an increased speed of the length of the sub display 120 and compare the calculated increased speed with a previously set reference speed to determine a position where the second application execution screen is displayed on the sub display.

Meanwhile, the controller according to one embodiment of the present specification may end execution of the second application when receiving a signal for decreasing the length of the sub display 120 from the measurement unit after displaying the second application execution screen on the sub display together with the first application execution screen.

At this time, the controller may re-determine the size of the first application execution screen on the basis of the corrected length of the sub display 120 after ending the second application.

The controller according to another embodiment of the present specification may display the second application execution screen on the main display when receiving a signal for decreasing the length of the sub display 120 from the measurement unit after displaying the second application execution screen on the sub display together with the first application execution screen.

At this time, the controller may re-determine the size of the first application execution screen on the basis of the corrected length of the sub display 120 after ending the second application.

Meanwhile, the controller according to the present specification may end execution of the first application or displays the first application execution screen on the main display when receiving a signal for decreasing the length of the sub display 120 to a value less than the initial value from the measurement unit after displaying the second application execution screen on the sub display together with the first application execution screen.

To achieve the above object, a control method of a display device according to the present specification is a method for controlling a display of an application execution screen in the display device having a main display and a flexible display for displaying execution screens of applications, the control method comprising the steps of setting the applications to a first application and a second application of multiple applications measuring a length of a sub display and outputting a signal on the length, wherein the sub display is a portion of the flexible display and is exposed to the outside of a housing for keeping the flexible display displaying the first application execution screen on the sub display when the length of the sub display 120 is a previously set initial value or more and determining a size of the first application execution screen in proportional to a first length of the sub display if the length of the sub display 120 is maintained for a predetermined time and displaying the second application execution screen on the sub display together with the first application execution screen when receiving a signal for increasing the length of the sub display 120 from the measurement unit.

Advantageous Effects

According to one aspect of the present specification, when multiple applications are displayed on a flexible display, a size of an application execution screen may be determined depending on intention of a user.

According to another aspect of the present specification, when multiple applications are displayed on a flexible display, an application to be first displayed may be determined.

According to still another aspect of the present specification, when multiple applications are displayed on a flexible display, an application execution screen to be displayed at a greater size may be determined.

According to further still another aspect of the present specification, after multiple applications are displayed on a flexible display, applications which are being executed may sequentially end or move.

BRIEF DESCRIPTION OF THE DRAWINGS

The accompanying drawings, which are included to provide a further understanding of the present specification, illustrate preferred embodiments of the present specification and together with the description serve to explain the technical spirits of the present specification, and thus the present specification should not be construed to be limited to the drawings.

BEST MODE FOR CARRYING OUT THE INVENTION

Hereinafter, the embodiments of the present specification will be described in detail with reference to the accompanying drawings. At this time, although the embodiments of the present specification will be described in detail with reference to the accompanying drawings and the disclosure described by the drawings, it is to be understood that the technical spirits and principles of the present specification are not limited by such embodiments.

Figure 1:
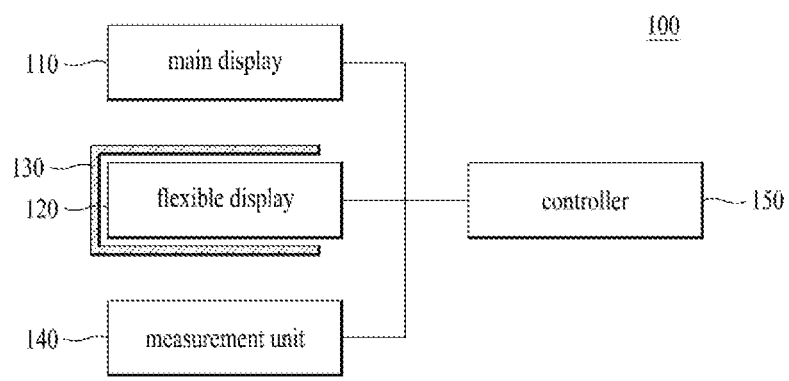
FIG. 1 is a block diagram briefly illustrating a display device according to one embodiment of the present specification.

FIG. 1 is a block diagram briefly illustrating a display device 100 according to one embodiment of the present specification.

Referring to FIG. 1, the display device 100 according to the present specification includes a main display 110, a flexible display 120, a housing 130, a measurement unit 140, and a controller 150.

The main display 110, the flexible display 120, the measurement unit 140 and the controller 150 are electrically connected to one another. Therefore, an application execution screen may be displayed on some or all of the main display 110 and the flexible display 120 in accordance with a control signal of the controller 150. Also, the measurement unit 140 may output a value measured by itself to the controller 150 as an electric signal. Also, the controller 150 may include an algorithm that may control various operations of the display device 100 in addition to a control operation, which will be described in this specification.

The housing 130 serves to keep the flexible display 120. The housing 130 may be a part of a case that physically surrounds the entire display device 100 according to the present specification, or may be a physical component that surrounds the flexible display 120 only.

Figure 2:
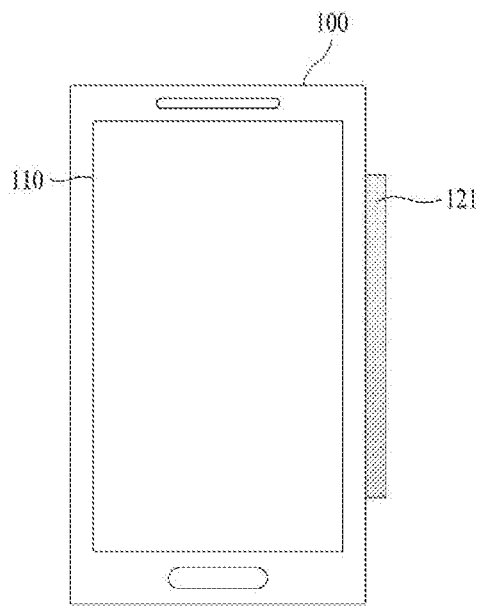
FIG. 2 is an exemplary view illustrating a display device according to the present specification.

FIG. 2 is an exemplary view illustrating a display device 100 according to the present specification.

Referring to FIG. 2, the display device 100 has a smart phone type in which the main display 110 is arranged on a front surface. The display device 100 is a device that may store digital data, execute multimedia or execute various applications. Examples of the display device 100 may include a mobile communication device, a notebook computer, a personal computer, a tablet computing device, a portable navigation device, a portable video player, a personal digital assistant (PDA), and other similar device. Therefore, the scope of the present specification is not limited by the shown embodiment.

Meanwhile, the flexible display 120 may be unfolded by a user if necessary. In the embodiment shown in FIG. 2, the flexible display 120 is not unfolded. The user may unfold the flexible display 120 as much as is desired by pulling a grip 121.

Figure 3:
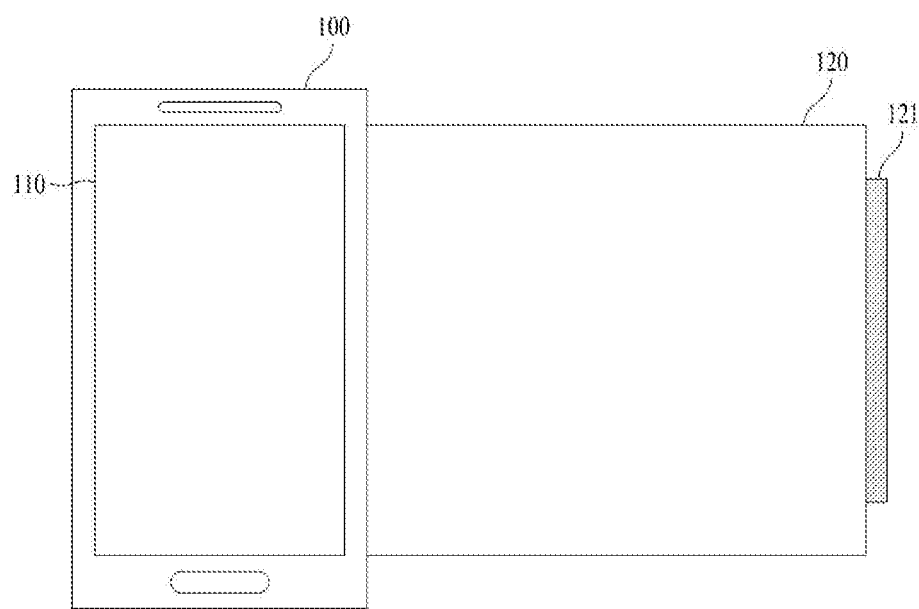
FIG. 3 is an exemplary view illustrating that a flexible display is unfolded.

FIG. 3 is an exemplary view illustrating that a flexible display 120 is unfolded.

Referring to FIG. 3, it is noted that the flexible display 120 is unfolded from a right side of the display device 100. In the embodiment shown in FIG. 3, the flexible display 120 is unfolded along a right direction of the display device 100. However, it is to be understood that the scope of the present specification is not limited by the embodiment of FIG. 3. The flexible display 120 may be unfolded in various directions such as upward, downward and left sides of the display device.

Figure 4:
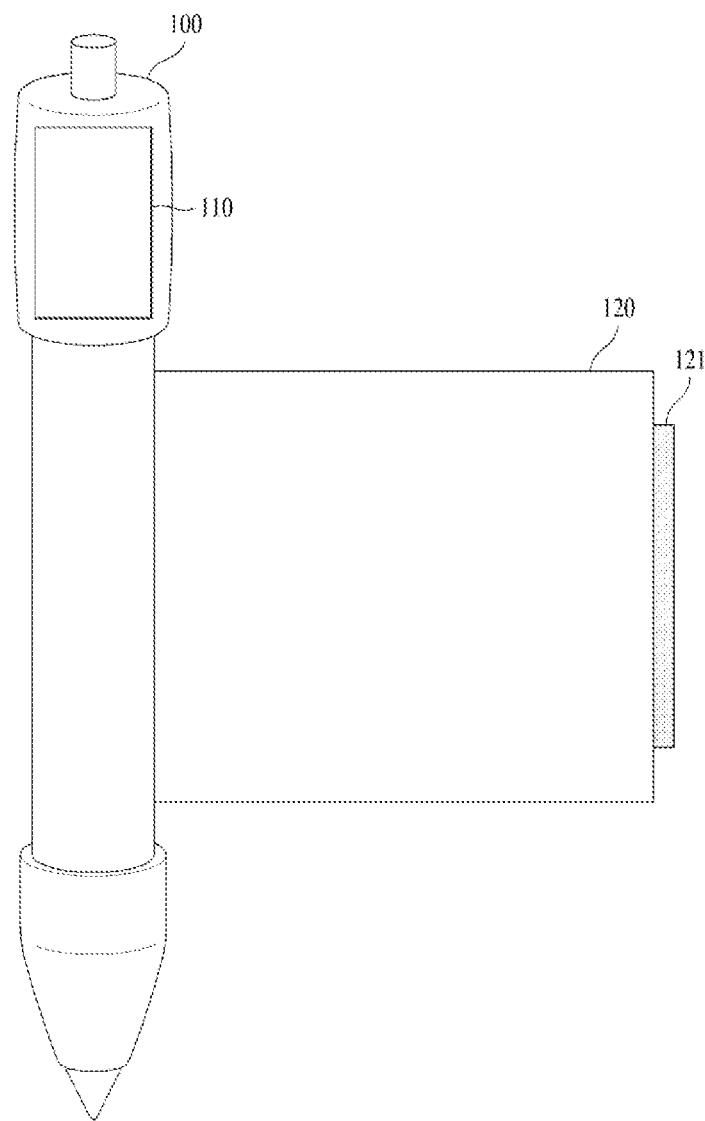
FIG. 4 is an exemplary view illustrating a smart pen type display device.

FIG. 4 is an exemplary view illustrating a smart pen type display device 100.

Referring to FIG. 4, it is noted that the display device 100 has a pen type unlike the embodiment shown in FIG. 3. As described above, the display device 100 is a device that may store digital data, execute multimedia or execute various applications, and is not limited by its types.

The flexible display 120 may have various lengths. In the embodiment shown in FIG. 3, when the flexible display 120 is fully unfolded, the flexible display 120 has a size of about twice of the main display 110. In the embodiment shown in FIG. 4, the size of the main display 110 is relatively small, and when the flexible display 120 is fully unfolded, the flexible display 120 has a size of about five times of the main display 110. In this way, the flexible display 120 may have a size different from that of the main display 110. The flexible display 120 may be smaller or greater than the main display 110. Therefore, the scope of the display device 100 according to the present specification is not limited by the sizes of the main display 110 and the flexible display 120.

Figure 5:
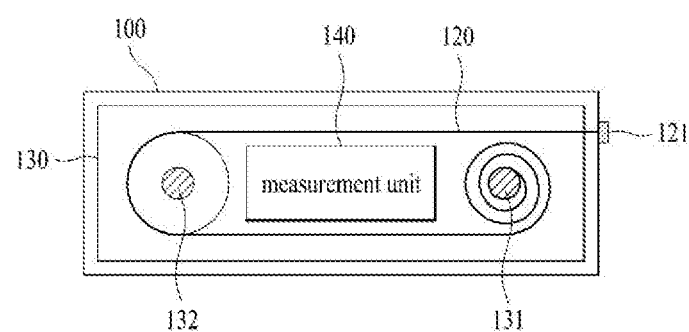
FIG. 5 is a cross-sectional view illustrating a display device according to the present specification.

FIG. 5 is a cross-sectional view illustrating a display device 100 according to the present specification.

Referring to FIG. 5, it is noted that the flexible display 120 is arranged inside the housing 130. The housing 130 is physically connected with the flexible display 120. The housing 130 serves to surround the flexible display 120. In this case, the term 'surround' does not always mean that the housing 130 physically surrounds the flexible display so as not to be externally exposed. The housing 130 serves to assist that the flexible display 120 may physically be connected to the display device 100. To this end, the housing 130 may physically be connected to a part of the flexible display 120, or may have a structure that the flexible display 120 is partially exposed externally.

Meanwhile, in the embodiment shown in FIG. 5, it is noted that the flexible display 120 is rolled by a main roller 131 and a sub roller 132 to have a rollable display type. The flexible display 120 may have various types such as a rollable display and a foldable display. Also, if the flexible display 120 has a rollable display type, the flexible display 120 may be rolled by the roller formed inside the housing like the embodiment shown in FIG. 5, and may be rolled by the roller formed outside the housing. Also, if the flexible display 120 has a foldable display type, the flexible display 120 may partially adjoin the outside of the display device 100, or may have a foldable type to cover the external appearance of the display device 100 like a protective case of the display device 100. In this specification, for convenience of understanding, the embodiment in which the flexible display 120 has a rollable display type will be described. However, the type of the flexible display 120 is not limited by the embodiment disclosed in the present specification.

Meanwhile, the controller 150 may control the flexible display 120 to be partially displayed on a screen. Particularly, the controller 150 may control the flexible display 120 to allow only a part of the flexible display 120, which is exposed to the outside of the housing 130, to be displayed on the screen. Referring to FIG. 2 again, the flexible display 120 may not be seen to a user. In this case, the controller 150 may control the flexible display 120 so as not to be fully displayed on the screen. Also, if the flexible display 120 is partially unfolded to be exposed to the outside of the housing 130, the controller 150 may control the flexible display 120 to allow only a part of the flexible display 120, which is exposed to the outside of the housing 130, to be displayed on the screen. In this specification, the part of the flexible display 120, which is exposed to the outside of the housing 130, that is, the part seen to the user will be referred to as a 'sub display'. Therefore, the sub display may be all or some of the flexible display 120, and may have various lengths. Meanwhile, in FIGS. 6 to 15, the flexible display and the sub display will be marked with the same reference numeral 120.

The measurement unit 140 may measure a length of the sub display 120. The measurement unit 140 may output a signal on the length to the controller 150.

Referring to FIG. 5 again, the embodiment that the measurement unit 140 is arranged inside the housing 130 is shown. In the embodiment shown in FIG. 5, the measurement unit 140 may indirectly measure the length of the sub display 120 by allowing the flexible display to measure a portion rolled by the main roller 131. However, the measurement unit 140 may measure the length of the sub display 120 in various manners. For another example, the measurement unit 140 may measure the length of the sub display 120 by sensing grooves previously formed at the flexible display 120 at certain intervals. For another example, the measurement unit 140 may indirectly measure the length of the sub display 120 by sensing a rotational direction and rotation times of the main roller 131. Therefore, it is to be understood that this specification should not be limited to the embodiment of the measurement unit 140 shown in FIG. 5.

Meanwhile, various applications may be installed and stored in the display device 100 according to the present specification. Also, since the controller 150 may have multitasking functions, the controller 150 may execute two or more applications at the same time.

Figure 6:
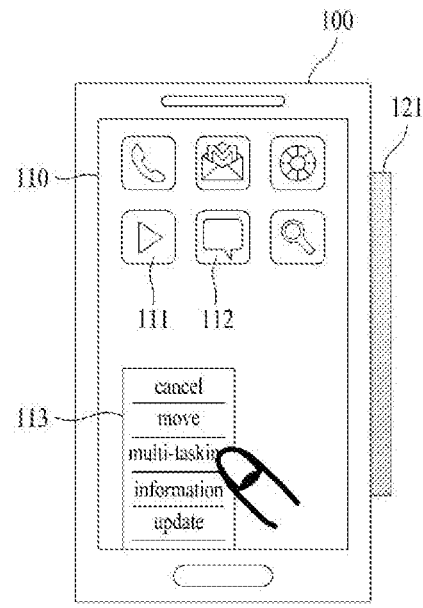
FIG. 6 is an exemplary view illustrating a main display provided with an interface in accordance with one embodiment of the present specification.

FIG. 6 is an exemplary view illustrating a main display 110 provided with an interface in accordance with one embodiment of the present specification.

Referring to FIG. 6, it is noted that a plurality of application icons are displayed on the main display 110. In this specification, the operation of the controller 150 will be described based on the embodiment that a moving image play application 111 and a chatting application 112 are executed at the same time.

The multiple applications which are executed at the same time may be set to a first application and a second application by various manners. The first application is an application set to be first displayed on the sub display 120. On the other hand, the second application has the ranking lower than the first application when it is displayed on the sub display 120. In this specification, the moving image play application 111 is set to the first application, and the chatting application 112 is set to the second application.

According to one embodiment of the present specification, the controller 150 may provide a user interface 113, which sets the first and second applications, to the main display 110 or the sub display 120. The interface 113 for allowing the user to set the first and second applications through a command language ('multitasking') displayed on the main display 110 in the form of a list is shown in FIG. 6. The controller 150 may set the first application and the second application in accordance with a content input by the user through the interface 113. Meanwhile, the interface 113 may have various input manners and various types, and may be displayed on the sub display 120.

According to another embodiment of the present specification, the controller 150 may set the first application and the second application in accordance with application attributes of the multiple applications selected by the user. The application attributes mean features owned by each application. For example, the application that plays a moving image is characterized in that it needs a screen relatively greater than the other applications. Also, the chatting application is characterized in that it needs a screen of which vertical direction is longer than those of the other applications to display conversation contents according to a time order. Also, an alarm application is characterized in that it needs a small screen to display time. In this way, there may be different characteristics per application. The controller 150 may determine characteristic of each application, i.e., attributes of each application and set the first application and the second application in accordance with the attributes of each application.

According to still another embodiment of the present specification, when multiple applications are selected by the user, the controller 150 may set a displayed order of the first application and the second application in accordance with the selected order.

Meanwhile, in this specification, the control operation of the controller 150 will be described based on that two applications are set to the first application and the second application. However, the controller 150 may execute N number of applications (N is a natural number more than 3) at the same time. In this case, one first application and N−1 number of second applications may be set. Also, if the controller 150 executes three or more applications at the same time, first to Nth applications may be set for each application. At this time, the order displayed on the sub display 120 by the user may be set between the multiple applications.

The controller 150 may control the execution screens of the applications set to the first application and the second application by input of the user, among the multiple applications, to be displayed on the main display 110 or the sub display 120.

Figure 7:
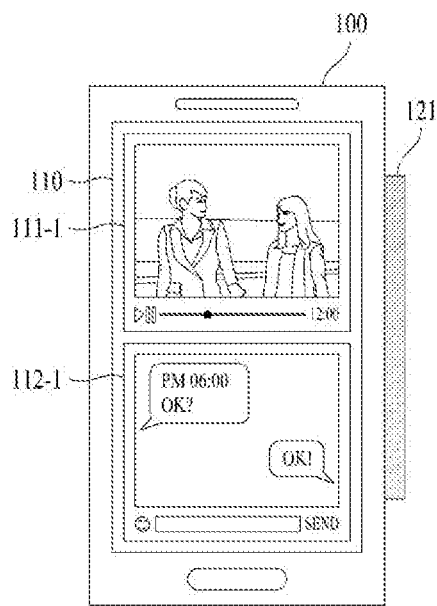
FIG. 7 is an exemplary view illustrating a main display on which a first application execution screen and a second application execution screen are displayed.

FIG. 7 is an exemplary view illustrating a main display on which a first application execution screen and a second application execution screen are displayed.

Referring to FIG. 7, each of an execution screen 111-1 of the first application, which corresponds to the state that the first application is executed, and an execution screen 112-1 of the second application, which corresponds to the state that the second application is executed, may be identified. In one example, the controller 150 may set and execute the first application and the second application at the same time. In another example, the controller 150 may execute the first application and the second application from the time when the sub display 120 is seen to the user as the user pulls the grip 121. In FIG. 7, since the sub display 120 is not seen to the user, the controller 150 executes the first application and the second application to display the execution screen 111-1 of the moving image application and the execution screen 112-1 of the chatting application on the main display 110. However, the execution timing of the applications executed by the controller 150 is not limited by the order according to the shown embodiment.

Meanwhile, the controller 150 may further display a guide interface that may identify the first application execution screen from the second application execution screen. The guide interface serves to notify the user of an application execution screen set to the first application or the second application. For example, the guide interface may be an interface that highlights a periphery area of any one of the first application execution screen and the second application execution screen. For another example, the guide interface may be an interface that applies a different color to each of an edge of the first application execution screen and an edge of the second application execution screen. The guide interface may allow the user to identify the first application execution screen from the second application execution screen in various manners.

The controller 150 may receive the signal on the length of the sub display 120 from the measurement unit 140 and display the first application execution screen 111-1 on the sub display 120 when the length of the sub display 120 is a previously set initial value or more.

Figure 8:
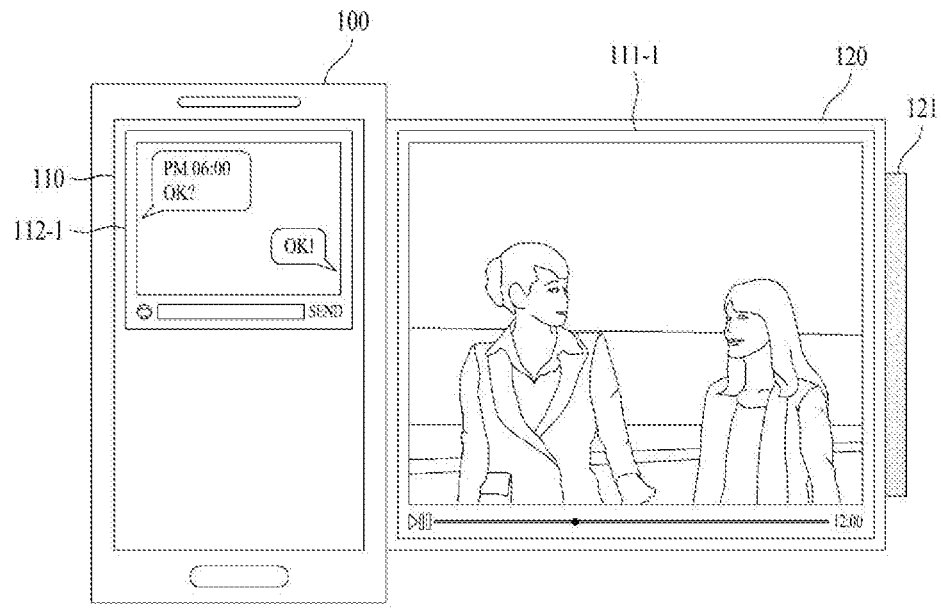
FIG. 8 is an exemplary view illustrating a first application execution screen displayed on a sub display in accordance with one embodiment.

FIG. 8 is an exemplary view illustrating a first application execution screen displayed on a sub display in accordance with one embodiment.

Referring to FIG. 8, it is noted that the first application execution screen 111-1 moves from the main display 110 and is displayed on the sub display 120. When the user controls the size of the sub display 120 to a desired size by pulling the grip 121, the measurement unit 140 measures the length of the sub display 120 and the outputs the signal on the length to the controller 150.

The controller 150 receives the signal on the length of the sub display 120 from the measurement unit 140. Also, the controller 150 may display the first application execution screen 111-1 on the sub display 120 when the length of the sub display 120 is a previously set initial value or more.

The 'initial value' is a minimum value that may display the execution screen of the application on the sub display 120. That is, if the length of the sub display 120, which is obtained by pulling the grip 121, is too small, it may be inappropriate to display the execution screen of the application on the sub display 120. Therefore, the controller 150 moves the first application execution screen 111-1 from the main display 110 and displays the first application execution screen 111-1 on the sub display 120 when the length of the sub display 120 is a previously set initial value or more. It will be apparent that the initial value may be set variously in accordance with the display device 100 according to the present specification.

The controller 150 may determine the size of the first application execution screen 111-1 in proportional to the length (hereinafter, referred to as a 'first length') of the sub display 120 when the length of the sub display 120 is maintained for a previously set reference time. The reference time is to determine whether the length of the sub display 120 is varied, and may be set variously.

Preferably, the controller 150 may determine that the length of the sub display 120 is maintained for the reference time when the length of the sub display 120 is varied within a previously set error range. The error range may be set variously considering a hand tremor, etc.

According to one embodiment of the present specification, the controller 150 may display a ratio of the first application execution screen 111-1 on the sub display 120 in accordance with a ratio of the sub display 120. Referring to FIG. 8 again, it is noted that the ratio of the first application execution screen 111-1 is determined in accordance with an aspect ratio of the sub display 120.

According to another embodiment of the present specification, the controller 150 may display the ratio of the first application execution screen 111-1 on the sub display 120 in accordance with a previously set ratio.

Figure 9:
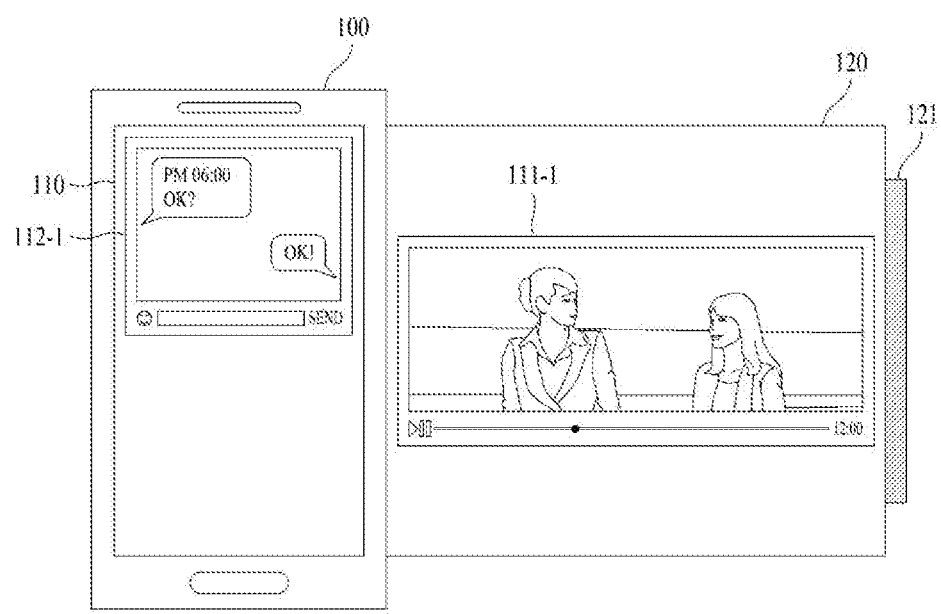
FIG. 9 is an exemplary view illustrating a first application execution screen displayed on a sub display in accordance with another embodiment.

FIG. 9 is an exemplary view illustrating a first application execution screen displayed on a sub display in accordance with another embodiment.

Referring to FIG. 9, it is noted that the ratio of the first application execution screen 111-1 is determined as 9:4. In case of a moving image file, a ratio of a moving image screen may be set previously. If the moving image file having a previously set screen ratio is executed in the moving image application, it may be preferable to determine the ratio of the application execution screen in accordance with the previously set screen ratio. Therefore, the controller 150 may display the first application execution screen 111-1 on the sub display 120 in accordance with the previously set screen ratio like the embodiment shown in FIG. 9.

Figure 10:
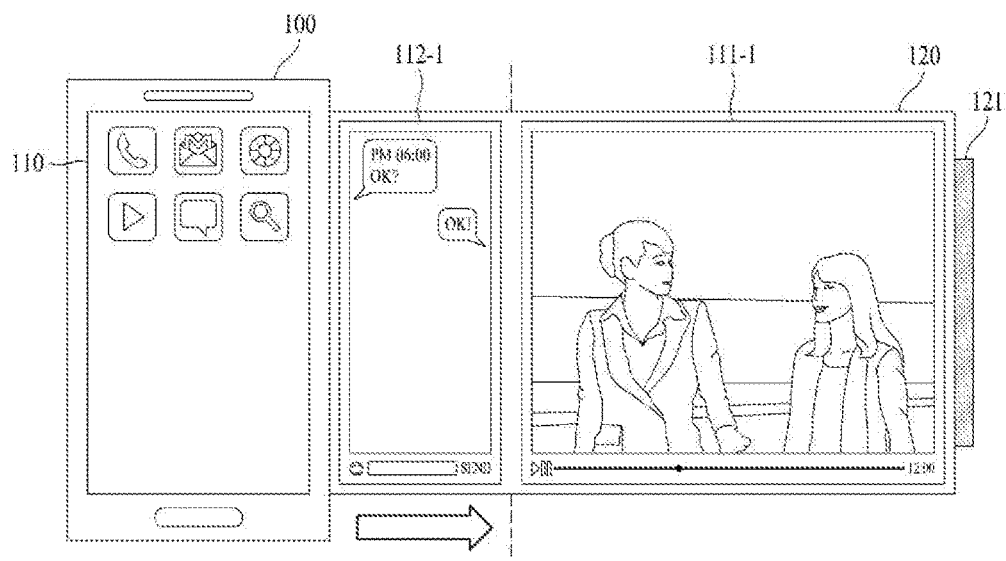
FIGS. 10 and 11 are exemplary views illustrating that the second application execution screen is displayed on the sub display.
Figure 11:
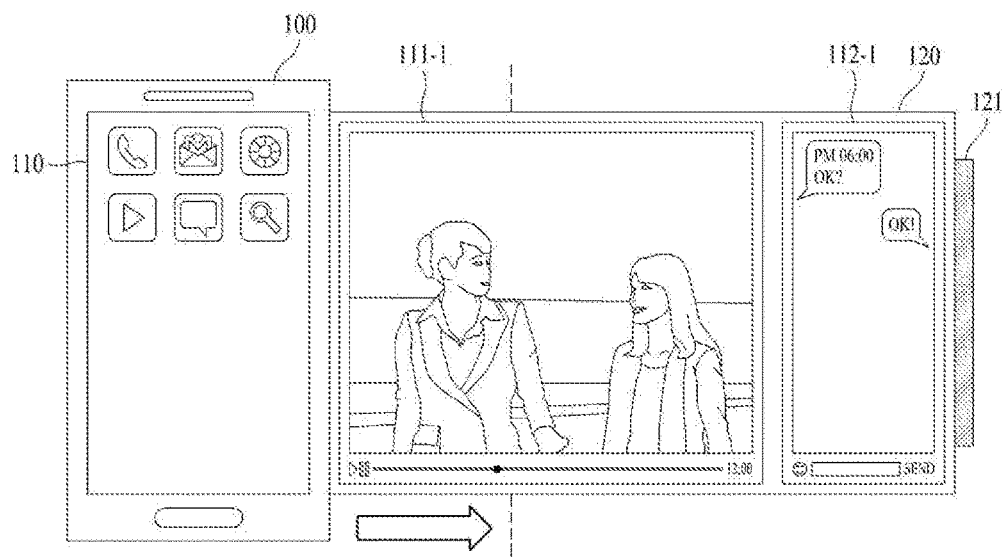

FIGS. 10 and 11 are exemplary views illustrating that the second application execution screen 112-1 is displayed on the sub display 120.

Referring to FIG. 10, it is noted that the size of the sub display 120 becomes great unlike the embodiment of FIG. 8. That is, this is the state that the user further pulls the grip 121 to the right side. If the controller 150 determines the size of the first application execution screen 111-1 and then receives the signal for increasing the length of the sub display 120 from the measurement unit 140, the controller 150 may control the second application execution screen 112-1 to be displayed on the sub display 120 together with the first application execution screen 111-1.

According to the embodiment of the present specification, the controller 150 may control the second application execution screen 112-1 to be displayed on the sub display 120 to adjoin the first application execution screen 111-1. In this case, 'adjoin' means that the first application execution screen 111-1 and the second application execution screen 112-1 are displayed on the sub display 120 so as not to overlap each other like the embodiment shown in FIG. 10.

According to the embodiment of the present invention, the controller 150 may determine the size of the second application execution screen 112-1 in proportional to the increased length (hereinafter, referred to as a 'second length') of the sub display 120 when the increased length of the sub display 120 is maintained for the previously set reference time. That is, the controller 150 may determine the size of the second application execution screen 112-1 in accordance with the increased length of the sub display 120 without change of the size of the first application execution screen 111-1.

According to one embodiment, the controller 150 may display a ratio of the second application execution screen 112-1 on the sub display 120 in accordance with a ratio of the sub display 120 according to the second length. According to another embodiment, the controller 150 may display the ratio of the second application execution screen 112-1 on the sub display 120 in accordance with a predetermined ratio. Description of the ratio of the second application execution screen 112-1 corresponds to the description of the ratio of the first application execution screen 111-1 in FIGS. 8 and 9, its repeated description will be omitted.

According to one embodiment, the controller 150 may display the second application execution screen 112-1 on a portion of the sub display 120, which is adjacent to the housing 130 like the embodiment shown in FIG. 10. According to another embodiment, the controller 150 may display the second application execution screen 112-1 on a portion of the sub display 120, which is far away from the housing 130 like the embodiment shown in FIG. 11.

At this time, the controller 150 may calculate an increased speed of the length of the sub display 120 and compare the calculated increased speed with a predetermined reference speed to determine a position where the second application execution screen 112-1 is displayed on the sub display 120. For example, if the calculated increased speed is faster than the predetermined reference speed, the controller 150 may determine the second application execution screen 112-1 to be displayed on the portion of the sub display, which is adjacent to the housing 130 (embodiment shown in FIG. 10). Also, if the calculated increased speed is slower than the predetermined reference speed, the controller 150 may determine the second application execution screen 112-1 to be displayed on the portion of the sub display, which is the farthest away from the housing 130 (embodiment shown in FIG. 11). Of course, opposite examples of the above embodiments are available.

Meanwhile, when the second application execution screen 112-1 is displayed on the sub display 120, the controller 150 may display a background screen or initial screen of an OS program, which is installed in the display device 100, on the main display 110.

According to one embodiment of the present invention, the controller 150 may display the second application execution screen 112-1 on the sub display 120 together with the first application execution screen 111-1 and then end execution of the second application when receiving a signal for decreasing the length of the sub display 120 from the measurement unit 140.

Figure 12:
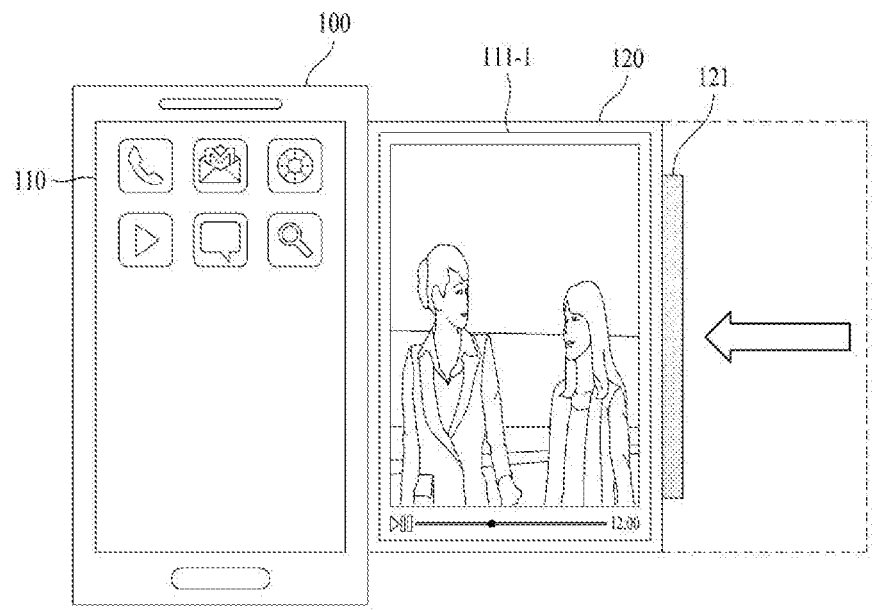
FIG. 12 is an exemplary view illustrating that execution of a second application ends.

FIG. 12 is an exemplary view illustrating that execution of a second application ends.

Referring to FIG. 12, unlike the embodiment of FIG. 10, it is noted that the length of the sub display 120 is decreased. As the user pushes the grip 121 to the left side, the length of the sub display 120 is decreased. If the controller 150 determines the size of the second application execution screen 112-1 and then receives the signal for decreasing the length of the sub display 120 from the measurement unit 140, the controller 150 may determine that the user wants to end execution of the second application. Therefore, the controller 150 may end execution of the second application.

At this time, the controller 150 may re-determine the size of the first application execution screen 111-1 on the basis of the corrected length of the sub display 120 after ending the second application.

According to another embodiment of the present specification, the controller 150 may display the second application execution screen 112-1 on the main display 110 when receiving the signal for decreasing the length of the sub display 120 from the measurement unit 140 after displaying the second application execution screen 112-1 on the sub display 120 together with the first application execution screen 111-1.

Figure 13:
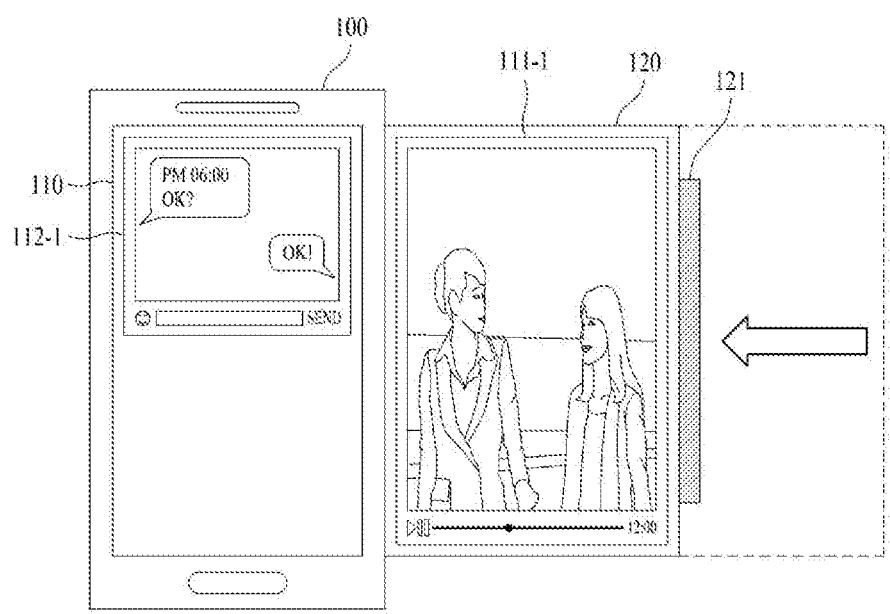
FIG. 13 is an exemplary view illustrating that the second application execution screen is displayed on a main display.

FIG. 13 is an exemplary view illustrating that the second application execution screen is displayed on a main display.

Referring to FIG. 13, unlike the embodiment of FIG. 10, it is noted that the length of the sub display 120 is decreased. As the user pushes the grip 121 to the left side, the length of the sub display 120 is decreased. If the controller 150 determines the size of the second application execution screen 112-1 and then receives the signal for decreasing the length of the sub display 120 from the measurement unit 140, the controller 150 may determine that the user wants to move the second application execution screen 112-1 to the main display 110. Therefore, the controller 150 may display the second application execution screen 112-1 on the main display 110.

At this time, the controller 150 may re-determine the size of the first application execution screen 111-1 on the basis of the corrected length of the sub display 120 after displaying the second application execution screen 112-1 on the main display 110.

According to the embodiment of the present specification, the controller 150 may end execution of the first application or display the first application execution screen 111-1 on the main display 110 when receiving the signal for decreasing the length of the sub display 120 to a value less than the initial value from the measurement unit 140 after displaying the second application execution screen 112-1 on the sub display 120 together with the first application execution screen 111-1.

Figure 14:
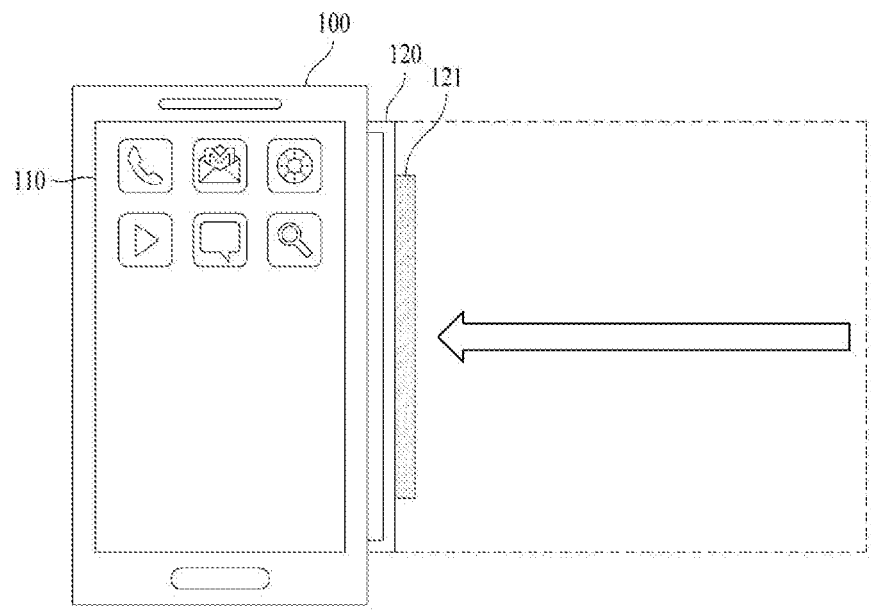
FIG. 14 is an exemplary view illustrating that execution of a first application ends.

FIG. 14 is an exemplary view illustrating that execution of a first application ends.

Referring to FIG. 14, unlike the embodiment of FIG. 10, it is noted that the length of the sub display 120 is decreased to the initial value or less. As the user pushes the grip 121 to the left side, the length of the sub display 120 is decreased to the initial value or less. If the controller 150 determines the size of the second application execution screen 112-1 and then receives the signal for decreasing the length of the sub display 120 to the initial value or less from the measurement unit 140, the controller 150 may determine that the user wants to end execution of the first application. Therefore, the controller 150 may end execution of the first application. At this time, the controller 150 may also end execution of the second application.

Figure 15:
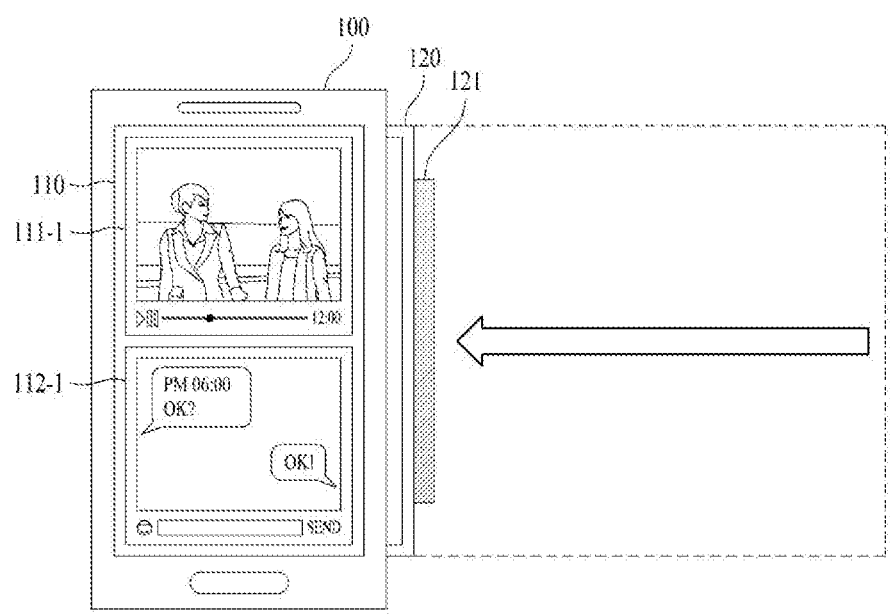
FIG. 15 is an exemplary view illustrating that the first application execution screen is displayed on a main display.

FIG. 15 is an exemplary view illustrating that the first application execution screen is displayed on a main display.

Referring to FIG. 15, unlike the embodiment of FIG. 10, it is noted that the length of the sub display 120 is decreased to the initial value or less. As the user pushes the grip 121 to the left side, the length of the sub display 120 is decreased to the initial value or less. If the controller 150 determines the size of the second application execution screen 112-1 and then receives the signal for decreasing the length of the sub display 120 to the initial value or less from the measurement unit 140, the controller 150 may determine that the user wants to move the first application execution screen 111-1 to the main display 110. Therefore, the controller 150 may display the first application execution screen 111-1 on the main display 110. At this time, the controller 150 may also move the second application execution screen 112-1 to the main display 110.

Hereinafter, a control method of the display device according to the present specification will be described. However, since the respective components of the display device 100 have been described in detail, their repeated description will be omitted.

Figure 16:
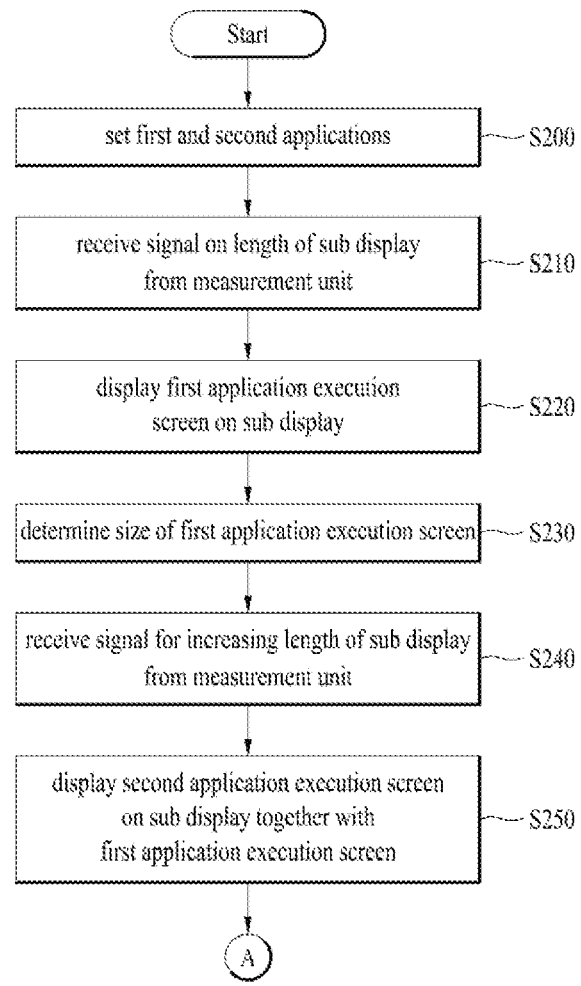
FIG. 16 is a flow chart illustrating a control method of a display device according to the present specification.

FIG. 16 is a flow chart illustrating a control method of a display device according to the present specification.

Referring to FIG. 16, in step S200, the controller 150 may set the first application and the second application of the multiple applications. The controller 150 moves to step S210 after performing the step S200.

According to one embodiment of the present invention, the controller 150 may provide the user interface for setting the first application and the second application to the main display or the sub display. That is, the controller 150 may set the first application and the second application of the multiple applications by selection of the user, which is input through the interface.

According to another embodiment of the present invention, the controller 150 may set the first application and the second application in accordance with application attributes of the first application and the second application selected by the user. Since this embodiment has been described in detail, its detailed description will be omitted.

According to still another embodiment of the present invention, the controller 150 may set the first application and the second application when the multiple applications are selected by the user.

Meanwhile, the controller may further display a guide interface that may identify the first application execution screen from the second application execution screen.

In next step S210, the controller 150 may measure the length of the portion (sub display) exposed to the outside of the housing 130, which keeps the flexible display, through the measurement unit 140, and may receive the signal on the length of the sub display 120 from the measurement unit 140 that measures the signal on the length. The controller 150 advances to step S220 after performing the step S210.

In next step S220, the controller 150 may display the first application execution screen 111-1 on the sub display 120 when the length of the sub display 120 is a previously set initial value or more. The controller 150 advances to step S230 after performing the step S220.

In next step S230, the controller 150 may determine the size of the first application execution screen 111-1 in proportional to the length (first length) of the sub display 120 if the length of the sub display 120 is maintained for a predetermined reference time. The controller 150 advances to step S240 after performing the step S230.

According to one embodiment of the present specification, the controller 150 may display the ratio of the first application execution screen 111-1 on the sub display 120 in proportional to the ratio of the sub display 120 according to the first length. Since this embodiment has been described with reference to FIG. 8, its detailed description will be omitted.

According to another embodiment of the present specification, the controller 150 may display the ratio of the first application execution screen 111-1 on the sub display 120 in accordance with a previously set ratio. Since this embodiment has been described with reference to FIG. 9, its detailed description will be omitted.

Meanwhile, the controller 150 may determine that the length of the sub display 120 is maintained for the reference time if the length of the sub display 120 is changed within a previously set error range.

In next step S240, the controller 150 may receive the signal for increasing the length of the sub display 120 from the measurement unit 140. The controller 150 advances to step S250 after performing the step S240.

In next step S250, the controller 150 may display the second application execution screen 112-1 on the sub display 120 together with the first application execution screen 111-1.

The controller 150 according to the present specification may control the second application execution screen 112-1 to be display on the sub display 120 to adjoin the first application execution screen 111-1.

According to one embodiment of the present specification, the controller 150 may determine the size of the second application execution screen 112-1 in proportional to the increased length (hereinafter, 'second length') of the sub display 120 if the increased length of the sub display 120 is maintained for the predetermined reference time.

According to another embodiment of the present specification, the controller 150 may display the ratio of the second application execution screen 112-1 on the sub display in accordance with the previously set ratio.

Meanwhile, the controller 150 may display the second application execution screen 112-1 on the portion of the sub display 120, which is adjacent to or is the farthest away from the housing 130. Since this embodiment has been described with reference to FIGS. 10 and 11, its repeated description will be omitted.

Moreover, the controller 150 may calculate an increased speed of the length of the sub display 120 and compare the calculated increased speed with a predetermined reference speed to determine a position where the second application execution screen 112-1 is displayed on the sub display 120.

Figure 17:
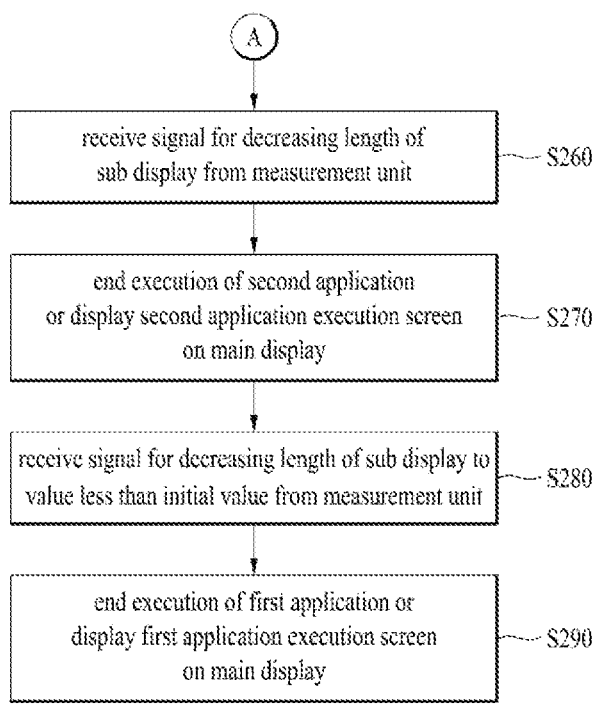
FIG. 17 is a flow chart illustrating additional control method of a display device according to the present specification.

FIG. 17 is a flow chart illustrating additional control method of a display device according to the present specification.

Referring to FIG. 17, in step S260, the controller 150 may display the second application execution screen 112-1 on the sub display together with the first application execution screen 111-1 after the step S250 and then receive the signal for decreasing the length of the sub display 120 from the measurement unit 140. The controller 150 advances to step S270 after performing the step S260.

In step S270, the controller 150 may end execution of the second application or display the second application execution screen 112-1 on the main display 110. The controller 150 advances to step S280 after performing the step S270. Since this embodiment has been described in detail with reference to FIGS. 12 and 13, its repeated description will be omitted.

Meanwhile, after ending execution of the second application or displaying the second application execution screen 112-1 on the main display 110, the controller 150 may re-determine the size of the first application execution screen 111-1 on the basis of the corrected length of the sub display 120.

In step S280, the controller 150 may receive the signal for decreasing the length of the sub display 120 to a value less than the initial value from the measurement unit 140. The controller 150 advances to step S290 after performing the step S280.

In step S290, the controller 150 may end execution of the first application or display the first application execution screen 111-1 on the main display 110. Since this embodiment has been described in detail with reference to FIGS. 14 and 15, its repeated description will be omitted.

Although the terms used in this specification are selected from generally known and used terms considering their functions in the present specification, the terms may be modified depending on intention of a person skilled in the art, practices, or the advent of new technology. Also, in special case, the terms mentioned in the description of the present specification may be selected by the applicant at his or her discretion, the detailed meanings of which are described in relevant parts of the description herein. Accordingly, the terms used herein should be understood not simply by the actual terms used but by the meaning lying within and the description disclosed herein.

Specific structural or functional descriptions in the embodiments disclosed in this specification are intended to describe the embodiments, and the embodiments can be carried out in various forms and it should not be understood that the scope of the invention is limited by the embodiments described in this specification.

Since the embodiments according to the present specification may be carried out in other specific ways and various modifications may be made in the embodiments, specific embodiments will be illustrated in the drawings and will be described in detail in this specification. However, this is not intended to limit the embodiments according to the present specification to a specific disclosed type, and it is to be understood that the embodiments according to the present specification include all changes, equivalents, or replacements included in spirits and technical scope of the present specification.

In the specification, when a part "comprises" or "includes" an element, it means that the part further comprises or includes another element unless otherwise mentioned. Also, the term " . . . module" disclosed in the specification means a unit for processing at least one function or operation, and may be implemented by hardware, software or combination of hardware and software.

Although the present specification has been described through the detailed embodiments, it will be apparent to those skilled in the art that the present specification can be embodied in other specific forms without departing from the spirit and essential characteristics of the specification. The scope of the specification should be determined by reasonable interpretation of the appended claims and all change which comes within the equivalent scope of the specification are included in the scope of the specification.

Also, although one dependent component is added for convenience of understanding in the description of the embodiments of the present specification, two or more dependent components may be added in the embodiments of the present specification. Thus, the scope of the present specification is not limited by the embodiment disclosed in this specification.

MODE FOR CARRYING OUT THE INVENTION

Various embodiments have been described in the best mode for carrying out the present specification. It will be apparent to those skilled in the art that the present specification can be embodied in other specific forms without departing from the spirit and essential characteristics of the specification. Thus, the scope of the specification should be determined by reasonable interpretation of the appended claims and all change which comes within the equivalent scope of the specification are included in the scope of the specification.

INDUSTRIAL APPLICABILITY

The present specification may fully or partially be applied to electronic devices.

The invention claimed is:

1. A display device comprising:
a housing;
a main display exposed on a side of the housing;
a flexible display comprising a sub display that is configured to be kept in the housing or taken out of the housing;
a measurement unit configured to:
measure a size of the sub display when the sub display is taken out of the housing; and
output a signal corresponding to the measured size; and
a controller configured to:
receive the signal from the measurement unit;
determine a first size of a first application execution screen associated with a first application and a second size of a second application execution screen associated with a second application based on the signal received from the measurement unit; and
cause the flexible display to display the first application execution screen and the second application execution screen together on the sub display according to the determined first and second sizes,
wherein the first application is different from the second application, and
wherein the first application execution screen and the second application execution screen are displayed together on the main display prior to being displayed together on the sub display.

2. The display device according to claim 1, wherein the controller is further configured to provide a user interface for setting the first application and the second application to the main display or the sub display on the flexible display.

3. The display device according to claim 1, wherein:
the first size and the second size are determined based on types of the first application and the second application; and
the first size and the second size are not always the same.

4. The display device according to claim 1, wherein the controller is further configured to set a displayed order of the first application and the second application in accordance with a selected order when the first and second applications are selected by a user.

5. The display device according to claim 2, wherein the controller is further configured to cause the flexible display to display a guide interface for distinguishing the first application execution screen from the second application execution screen.

6. The display device according to claim 1, wherein the controller is further configured to determine that the size of the sub display is maintained for a predetermined time when the size of the sub display is changed within an error range which is previously set.

7. The display device according to claim 1, wherein the controller is further configured to display a ratio of the first application execution screen on the sub display in accordance with a ratio of the sub display determined according to the size of the sub display.

8. The display device according to claim 1, wherein the controller is further configured to display a ratio of the first application execution screen on the sub display in accordance with a previously set ratio.

9. The display device according to claim 1, wherein the controller is further configured to display the second application execution screen on the sub display to adjoin the first application execution screen.

10. The display device according to claim 1, wherein the controller is further configured to determine the size of the second application execution screen in proportion to an increased portion length of the sub display when the increased length of the sub display is maintained for a predetermined time.

11. The display device according to claim 10, wherein the controller is further configured to display a ratio of the second application execution screen on the sub display in accordance with a ratio of the sub display according to the increased portion length.

12. The display device according to claim 10, wherein the controller is further configured to display a ratio of the second application execution screen on the sub display in accordance with a previously set ratio.

13. The display device according to claim 1, wherein the controller is further configured to display the second application execution screen on a portion of the sub display, which is adjacent to the housing or is the farthest away from the housing.

14. The display device according to claim 13, wherein the controller is further configured to:
calculate an increased speed of the length of the sub display, and
compare the calculated increased speed with a previously set reference speed to determine a position where the second application execution screen is displayed on the sub display.

15. The display device according to claim 1, wherein the controller is further configured to end execution of the second application when receiving a signal for decreasing the size of the sub display from the measurement unit after displaying the second application execution screen on the sub display together with the first application execution screen.

16. The display device according to claim 15, wherein the controller is further configured to re-determine the size of the first application execution screen on the basis of the decreased size of the sub display after ending the second application.

17. The display device according to claim 2, wherein the controller is further configured to display the second application execution screen on the main display when receiving a signal for decreasing the size of the sub display from the measurement unit after displaying the second application execution screen on the sub display together with the first application execution screen.

18. The display device according to claim 17, wherein the controller is further configured to re-determine the size of the first application execution screen on the basis of the decreased size of the sub display after ending the second application.

19. The display device according to claim 2, wherein the controller is further configured to end execution of the first application or display the first application execution screen on the main display when receiving a signal for decreasing the size of the sub display to a value less than an initial value from the measurement unit after displaying the second application execution screen on the sub display together with the first application execution screen.

20. A control method of a display device having a housing, a main display exposed on a side of the housing, and a flexible display comprising a sub display that is configured to be kept in the housing or taken out of the housing, the control method comprising:

measuring a size of the sub display when the sub display is taken out of the housing;

generating a signal corresponding to the measured size;

determining a first size of a first application execution screen associated with a first application and a second size of a second application execution screen associated with a second application based on the signal; and displaying the first application execution screen and the second application execution screen together on the sub display according to the determined first and second sizes, wherein the first application is different from the second application, and wherein the first application execution screen and the second application execution screen are displayed together on the main display prior to being displayed together on the sub display.

\* \* \* \* \*